United States Patent [19]

Golembeski et al.

[11] Patent Number: 4,503,203

[45] Date of Patent: Mar. 5, 1985

[54] PREPARATION OF GRANULAR STEREOREGULAR BUTENE-1 POLYMERS IN A FLUIDIZED BED

[75] Inventors: Nancy M. Golembeski, Fords, N.J.; Robert J. Jorgensen, Dunbar; Robert D. Cleland, Charleston, both of W. Va.; Allen Noshay, East Brunswick, N.J.

[73] Assignee: Union Carbide Corporation, Danbury, Conn.

[21] Appl. No.: 563,470

[22] Filed: Dec. 20, 1983

[51] Int. Cl.$^3$ .......................... C08F 4/44; C08F 2/00; C08F 10/04
[52] U.S. Cl. .................................. 526/159; 526/88; 526/348.6; 526/901; 526/905; 526/908
[58] Field of Search ...................... 526/88, 159, 348.6, 526/901, 905, 908

[56] References Cited

U.S. PATENT DOCUMENTS

| | | | |
|---|---|---|---|
| 26,517 | 1/1969 | Natta et al. | 260/93.7 |
| 3,152,106 | 10/1964 | Mostert | 526/159 |
| 3,168,484 | 2/1965 | Engel et al. | 252/429 |
| 3,580,898 | 5/1971 | Rosen et al. | 526/159 |
| 3,678,023 | 7/1972 | Frese | 260/93.7 |
| 3,922,322 | 11/1975 | Roger et al. | 260/878 B |
| 3,925,338 | 12/1975 | Ort | 526/159 |

*Primary Examiner*—Joseph L. Schofer
*Assistant Examiner*—Fred M. Teskin
*Attorney, Agent, or Firm*—John S. Piscitello

[57] ABSTRACT

Granular stereoregular butene-1 polymers having a high isotactic content, and an extractables content of no more than about 15 weight percent in boiling ethyl ether, are produced over a continuous extended period of time in a low pressure gas phase fluidized bed process, in the absence of liquid diluent components, with a stereospecific olefin polymerization catalyst under a selected set of operating conditions.

5 Claims, No Drawings

PREPARATION OF GRANULAR STEREOREGULAR BUTENE-1 POLYMERS IN A FLUIDIZED BED

FIELD OF THE INVENTION

This invention relates to a process for preparing granular stereoregular butene-1 polymers by a low pressure gas phase fluidized bed process. More particularly, this invention relates to a low pressure gas phase fluidized bed process for preparing butene-1 polymers having relatively high isotactic contents, relatively high molecular weights, and good morphological properties, over a continuous extended period of time.

BACKGROUND OF THE INVENTION

Low pressure processes for producing butene-1 polymers in granular form are known in the art. These prior art processes, however, have a number of shortcomings in terms of either, or both, the process employed and the polymer product produced, when considered from the perspective of producing granular stereoregular butene-1 polymers on a commercial scale.

U.S. Pat. No. 3,678,023 discloses a low pressure process which is conducted in liquified gas and results in the production of atactic, rather than isotactic, polybutene-1. Such atactic polymers have decidedly different utilities than isotactic polymers. Further, because of the nature of the process employed, and the product produced, the product must be precipitated with an alcohol in order to obtain the desired granular form of the polymer, and the polymer then has to be extensively dried to rid it of alcohol and residual monomer.

U.S. Pat. No. Re 26,517 discloses the gas phase preparation of isotactic polybutene in an autoclave, in the substantial absence of solvents, with a stereospecific catalyst. However, this process is a batch type process which is not amenable to long term continuous operation. In addition, the butene-1 polymer produced by such process has a relatively high content of oily low molecular weight products and amorphous materials.

U.S. Pat. No. 3,168,484 discloses the preparation of solid particulate olefin polymers from monomers including ethylene, propylene and butylene, in a gas phase fluidized bed process, in the absence of solvents, by polymerizing the monomer charge with liquid catalyst components adsorbed on porous supports such as silica. Although the process is said to be continuous, wide ranges of pressure and temperature are given, and no conditions are given, specifically, for the continuous preparation of granular isotactic butene-1 polymers. Further, the process apparently requires the use, as illustrated in the Examples therein, of a heat-treated catalyst.

U.S. Pat. No. 3,580,898 discloses the vapor phase preparation of solid granular isotactic polybutene-1 with stereoregular catalysts. The process is conducted in a rotating reactor employing very specific reaction conditions, as well as a very specific catalyst system, in order to avoid agglomeration of the polymeric product in the reactor. Thus, this process requires the use of graduated, and relatively low, levels of both temperature and pressure, as well as the use of a single metal alkyl co-catalyst, diethyl aluminum chloride. The use of other commonly employed metal alkyl co-catalysts is apparently not suitable in the process. Said co-catalyst, as well as the other component of the catalyst system, is fed to the reactor in a small amount of solvent. Because of the need for the rotary reactor, and special reaction conditions, particularly the very specific temperature controls, the possibility of using this process commercially is severly curtailed, if not eliminated.

U.S. Pat. No. 3,922,322 discloses the preparation of solid particulate olefin polymers from $C_2$ to $C_{10}$ olefins in a gas phase fluidized bed process, in the absence of liquid catalyst diluents, by forming a catalyst prepolymer, storing this catalyst prepolymer under hydrogen, and then feeding the catalyst prepolymer and co-catalyst into the reactor with hydrogen gas. Although butene-1 is included within the scope of the olefins defined as useful in the process of this patent, no conditions are given, specifically, for the preparation of butene-1 polymers. Butene-1 polymers made by this process would be expected to undergo a postpolymerization treatment for the removal of atactic fractions.

Ethylene homo- and co-polymers have been made commercially in granular form in gas phase fluidized bed processes with various catalyst systems, as disclosed, for example, in U.S. Pat. Nos. 4,302,565 and 4,303,771. In order to operate these commercially useful processes successfully, it is necessary to properly combine both process conditions and catalyst compositions for the specific monomer charges employed.

SUMMARY OF THE INVENTION

The object of the present invention is to provide a simple continuous gas phase process for the preparation of stereoregular butene-1 polymers.

In accordance with the object of the present invention, it has now been discovered that granular stereoregular butene-1 polymers having a high isotactic content, and a low extractables content in boiling ethyl ether, can be produced over a continuous extended period of time by catalytically polymerizing a monomer charge of butene-1, or butene-1 and one or more $C_2$ to $C_6$ alpha monoolefins other than butene-1, by means of a stereospecific olefin polymerization catalyst, in a low pressure gas phase fluidized bed process, provided the reaction system is free of liquid diluent components and a specific set of reaction conditions is employed.

DESCRIPTION OF THE PREFERRED EMBODIMENT

Butene-1 Polymers

The butene-1 polymers that are directly prepared in the process of the present invention are solid, free flowing, particulate materials that may be homopolymers, or copolymers of butene-1 with up to about 20, and preferably about 1 to 15, mol percent of one or more $C_2$ to $C_6$ alpha monoolefins other than butene-1. The copolymers, therefore, contain at least about 80, and preferably about 85 to 99, mol percent of butene-1.

These polymers are essentially isotatic in nature with an NMR atactic fraction of no more than about 15 weight percent, preferably no more than about 10 weight percent. The NMR atactic fraction of the polymers is determined by the procedure described by A. Bunn and M. E. A. Cudby, Polymer, 17, 548 (1976).

The polymers have an extractables content in boiling (at atmospheric pressure) ethyl ether of no more than about 15 weight percent, preferably no more than about 5 to 10 weight percent.

As directly recovered from the reactor, the polymers have good morphological properties, i.e., a settled bulk density of about 15 to 20 lbs/ft$^3$, an average particle size of about 0.02 to 0.06 inch, a melt index of about 0.1 to 5 dg/minute,
a molecular weight distribution, $M_w/M_n$, of about 5 to 10, and
a melting point of about 70° to 100° C.

The polymers produced contain catalyst residues of less than about 1000 ppm, preferably less than about 50 ppm, of transition metal, and less than about 6000 ppm, preferably less than about 300 ppm, of halide.

Stereospecific Catalyst

The catalyst used in the process of the present invention may be any Ziegler-Natta type system known to be useful for the stereospecific polymerization of $C_3$ to $C_6$ alpha monoolefins. These catalyst systems usually comprise a compound of a transition metal of sub Groups IVa, Va or VIa (of the Mendelyeev Periodic Table), and an organometallic co-catalyst. The transition metal containing compound is preferably a solid halide, oxyhalide, or ester, and most preferably a chloride, of Ti, V, Zn and Hf.

The transition metal compound may be used as is, or in conjunction with adjuvant materials, such as supports and electron donor compounds, as are commonly employed in the art.

The co-catalyst is an organometallic compound of a metal of Groups II or III (of the Mendelyeev Periodic Table), preferably of Al, Zn or Mg, which acts as a reducing/alkylating agent on the transition metal compound. The most preferred co-catalysts have the general formula $AlR_nX_{3-n}$ wherein R represents an alkyl group having 1 to 12 carbon atoms, X is a hydrogen atom or a halogen atom, preferably chlorine, and n is an integer or a fraction having a value of from 1 to 2.

The organometallic compound and the transition metal compound are used in such amounts as to provide an atomic ratio between the metal of the organometallic compound and the transition metal of from about 1 to 200, and preferably of from about 3 to 100.

When either the transition metal compound or the organometallic compound is a liquid, it is impregnated in an inert porous carrier and stripped of any solvent prior to being introduced into the polymerization thereof. Such carriers should have an average particle size of from about about 0.0028 to 0.06 inches, and when impregnated with the liquid catalyst component should be fluidizable under the reaction conditions being employed. Particulate materials such as magnesia, silica, alumina and olefin polymers may be employed for this purpose.

Polymerization Process

In order to prepare the above described butene-1 polymers in a gas phase fluidized bed process it has been found necessary to conduct the process in the absence of liquid diluent components under the following set of conditions:

a temperature of about 40° to 55° C.
a space time yield of about 1 to 8 lbs/hour/ft³,
a partial pressure of olefin monomers of about 30 to 50 psi,
an inert gas pressure of about 50 to 70 psi,
a hydrogen concentration of about 0.1 to 5 mol percent (based on the butene-1 content of the reactor),
and a total pressure of about 80 to 100 psi. (olefin + H₂ + inert gas)

Hydrogen gas is used as a molecular weight control agent.

The inert gases that may be used include nitrogen and argon.

The total pressure to be employed during the reaction is, in part, determined by the dew or condensation point of the monomer(s) employed at the desired operating temperature. The pressure is selected to prevent the monomer(s) from condensing out.

The gaseous reaction mixture should, of course, be substantially free of catalyst poisons, such as moisture, oxygen, carbon monoxide, carbon dioxide, acetylene and the like.

By "continuously polymerize" as used herein is meant the capability of uninterrupted polymerization for one or more days at a time without reactor fouling due to the production of large agglomerations of polymer.

The following Examples are provided to illustrate the process of the present invention and are not intended as a limitation upon the scope thereof.

The properties of the polymers produced herein were determined by the following test methods:

Catalyst Residue

A sample of the resin product is ashed, and the metal and halide content of the ash is determined by elemental analysis. Catalyst residue is expressed as parts of transition metal and/or halide per million parts of resin.

Average Particle Size

Calculated from sieve analysis data measured according to ASTM-D-1921, Method A, using a 500 g sample. Calculations are based on weight fractions retained on the screens.

Bulk Density

The resin is poured via ⅜" diameter funnel into a 100 ml graduated cylinder to 100 ml line without shaking the cylinder, and weighed by difference.

Extractables Content

Determined by extracting the polymer in a Bailey Walker Extraction Apparatus with diethyl ether (35° C. B.P.) for 4 hours. The insoluble portion represents the isotactic portion of the polymer.

NMR Atactic Fraction

Determined in accordance with the procedure described by A. Bunn and M. E. A. Cudby, Polymer, 17, 548 (1976).

Melt Index (M.I.)

ASTM D-12348—Condition L.—Measured at 230° C.; reported as decigrams per minute.

Molecular Weight Distribution ($M_w/M_n$)

Gel Permeation Chromatography: Styrogel column packing (pore size packing sequence is $10^7$, $10^5$, $10^4$, $10^3$, 60 Å); solvent is 1,2,4-trichloro-benzene at 136° C.; detection is by infra red at 3–4/μ.

EXAMPLES

Catalyst Preparation

The catalyst system can be prepared by either Procedure A or Procedure B, as outlined below.

Procedure A:

Five hundred grams (500 g) of Davison 952 silica (which had previously been dehydrated at 800° C.) was admixed with 500 grams of diethyl aluminum chloride in 1.5 to 3.0 liters of isopentane. The system was stirred to assist in depositing/impregnating the aluminum compound on/in the porous silica support. The solvent was then stripped at 70° C. to produce a solid, particulate, free flowing material. Subsequently, this free flowing material was physically blended over a period of about 15 minutes with 162 grams of TiCl$_3$.⅓AlCl$_3$ (Stauffer Chemical Company's grade AAX 2.1) at ambient temperature to produce an activated catalyst system in the form of a free flowing solid mixture feedable in a solids catalyst feeder. The Al:Ti ratio of the catalyst system was 4.5:1 (based on the Al content of the diethyl aluminum chloride).

Procedure B:

An essentially one step procedure in which the diethyl aluminum chloride is deposited/impregnated on/in the silica support and stripped of solvent in the presence of the TiCl$_3$.⅓AlCl$_3$.

Polymerization Reactor

The polymerization reactor was a fluidized bed reactor, as shown in U.S. Pat. No. 4,370,456, except for the absence of the recycle loop represented by elements 18, 19, 20 and 21.

The reactor had a bed height of about 6 feet. The catalyst feeder employed was a capillary tube type feeder, as described in U.S. Pat. Nos. 3,779,712 and 3,876,602, which had a feed rate of about 500 grams of supported catalyst per hour.

EXAMPLE 1

Butene-1 was homopolymerized in the reactor described above with the catalyst prepared as described in Procedure A above. Polymerization was conducted at 41° C., under a total reactor pressure of 90 psi, at a space time yield of 2 lbs/hr/ft$^3$. The butene-1 partial pressure was 50 psi, and a molar ratio of hydrogen:butene-1 of 0.007:1 was employed.

The reaction was run continuously and smoothly for 24 hours at a fluidized bed height of 6 feet and a bulk density of the fluidized bed of 13.4 lbs/ft$^3$. The catalyst had a 7.8 hour residence time in the reactor. The butene-1 homopolymer produced was a particulate isotactic material having a melt index of 0.06 dg/min, a molecular weight distribution ($M_w/M_n$) of 7.4, an extractables content of 6.9% in boiling ethyl ether, a bulk density of 17.9 lb/ft$^3$, and an average particle size of 0.022 inch. The polymer contained 437 ppm Ti and 2800 ppm Cl, by analysis.

COMPARATIVE EXAMPLE A

The reaction conditions employed in this example were the same as those employed in Example 1 above except that the polymerization temperature was 73° C. and the solid blended catalyst system employed had an Al:Ti ratio of 3:1. Unlike the procedure employed in Example 1, however, additional diethyl aluminum chloride was separately fed to the reactor as a 10 weight percent solution in isopentane to maintain a total Al:Ti ratio in the reactor of 4.5:1 (based on the Al content of the diethyl aluminum chloride).

Within three hours the bed in the reactor had fused into a single, solid log of polymer and catalyst due to the relatively high temperature employed and the presence of the isopentane. About 3 to 4 liters of isopentane had been fed to the reactor during this three hour period. Many man-hours of work were required to remove the fused mass from the reactor.

COMPARATIVE EXAMPLE B

The reaction conditions employed in this example were the same as those employed in Comparative Example A above except that the reactor was operated at 40° C. Chunks of polymer formed in the reactor after about four hours of operation which could not be readily fluidized, forcing a shutdown of the process. This chunking was caused by the presence of the isopentane solvent. About 3 to 4 liters of isopentane had been fed to the reactor during this four hour period.

EXAMPLE 2

The reactor and catalyst employed in Example 1 above were employed to produce a random butene-1/propylene copolymer. Polymerization was conducted at 50° C. under a total reactor pressure of 90 psi, at a space time yield of 2 lbs/hr/ft$^3$. The butene-1 partial pressure was 30 psi, the propylene/butene-1 mol ratio was 0.07:1, and the hydrogen:butene-1 mol ratio was 0.043:1.

The reaction was run continuously and smoothly for 24 hours at a fluidized bed height of 6 feet and a bulk density of the fluidized bed of 13.2 lbs/ft$^3$. The catalyst had a residence time of 15 hours in the reactor. The copolymer produced was a particulate material having an NMR atactic fraction of about 6.4%, an extractables content of 5.5% in boiling ethyl ether, a bulk density of 17.6 lbs/ft$^3$, a melt index of 1.6 dg/min, a molecular weight distribution ($M_w/M_n$) of 8.2, and an average particle size of 0.038 inch. The copolymer contained 2.9 mol percent of propylene. The copolymer contained 470 ppm Ti and 2900 ppm Cl, by analysis.

We claim:

1. A process for preparing granular stereoregular butene-1 polymers containing at least 80 mol percent of butene-1, and up to 20 mol percent of one or more $C_2$ to $C_6$ alpha monoolefins other than butene-1, by continuously polymerizing a monomer charge of butene-1, or butene-1 and one or more $C_2$ to $C_6$ alpha monoolefins other than butene-1, in a gas phase fluidized bed process, in the absence of liquid diluent components, by contacting said monomer with a stereospecific olefin polymerization catalyst comprising (A) an organometallic compound and (B) a transition metal compound, said organometallic compound or said transition metal compound being impregnated in an inert porous carrier when such compound is a liquid, said carrier having an average particle size of from about 0.0028 to 0.06 inches, and said impregnated carrier being employed throughout the process, under the following conditions throughout the process:

a temperature of 40° to 55° C.,
a space time yield of 1 to 8 lbs/hour/ft$^3$,
a total pressure of 80 to 100 psi,
a partial pressure of said monomer charge of 30 to 50 psi,
an inert gas pressure of 50 to 70 psi, and
a hydrogen concentration of 0.1 to 5 mol percent.

2. A process as in claim 1 for preparing butene-1 homopolymer.

3. A process as in claim 1 for preparing a copolymer of butene-1 and one or more $C_2$ to $C_6$ alpha monoolefins other than butene-1.

4. A process as in claim 3 for preparing a copolymer of butene-1 and propylene.

5. A process as in claim 1 in which the organometallic compound is a liquid which is impregnated in an inert porous carrier.

* * * * *